United States Patent [19]

Shalhoob et al.

[11] 4,216,092
[45] Aug. 5, 1980

[54] COAXIAL HYDROMAGNETIC DEVICE FOR HYDRAULIC CIRCUITS CONTAINING CALCIUM AND MAGNESIUM IONS

[75] Inventors: William N. Shalhoob, Santa Ynez; Carl W. Chenchick, Santa Monica; Alfred F. Kaspaul, Malibu, all of Calif.

[73] Assignee: Hydromagnetics, Inc., Solvang, Calif.

[21] Appl. No.: 927,034

[22] Filed: Jul. 24, 1978

[51] Int. Cl.² .............................................. B03C 1/14
[52] U.S. Cl. .................................................. 210/222
[58] Field of Search .............................. 210/222, 223

[56] References Cited

U.S. PATENT DOCUMENTS

| | | | |
|---|---|---|---|
| 2,652,925 | 9/1953 | Vermeilen | 210/222 |
| 2,678,729 | 5/1954 | Spidg | 210/222 |
| 2,825,464 | 3/1958 | Mock | 210/222 |
| 2,937,710 | 5/1960 | Michael et al. | 210/222 |
| 3,228,878 | 1/1966 | Moody | 210/222 |
| 3,669,274 | 6/1972 | Happ et al. | 210/222 |
| 3,923,660 | 12/1975 | Kottmeier | 210/222 |
| 3,951,807 | 4/1976 | Sanderson | 210/222 |

FOREIGN PATENT DOCUMENTS 566307 4/1958 France ..................... 210/222

Primary Examiner—Charles N. Hart
Assistant Examiner—Richard W. Burks
Attorney, Agent, or Firm—Kenneth E. Darnell

[57] ABSTRACT

A coaxial hydromagnetic device for inhibiting or reducing the adhesion of calcium and magnesium scale to heat transfer surfaces, boiler walls, and similar surfaces which must be kept free from undesirable scale deposits on exposure to "hard" water, the present hydromagnetic device comprises magnets mounted preferably within a non-ferrous receptacle, the magnets being preferably separated by plastic spacers. The respective adjacent poles of the magnets are of like polarity. The magnet-containing receptacle is supported within a water feed-line, an outer tubular envelope formed of non-ferrous material preferably containing the magnet-containing receptacle and being disposed in the water feed-line. In a particular embodiment of the invention, the outer envelope has a number of spaced annular constrictions formed therein, one or more permanent magnets being held within the central hollow cavity of the envelope preferably within a non-ferrous receptacle as aforesaid. In another embodiment of the invention, magnets encircle the annularly constricted outer envelope, a preferably removable soft iron core being held within the central hollow cavity of the envelope. The location of the annular constrictions in the envelope coincides with each source or "sink" of magnetic field lines produced by the magnet or magnets. The hollow cavity of the envelope in preferred embodiments of the invention is accessable at one end for insertion or removal of magnetic structure without disturbing the hydraulic circuit. The present structure is particularly configured to initiate auto-nucleation of scale within the bulk of the liquid passing through the device.

10 Claims, 11 Drawing Figures

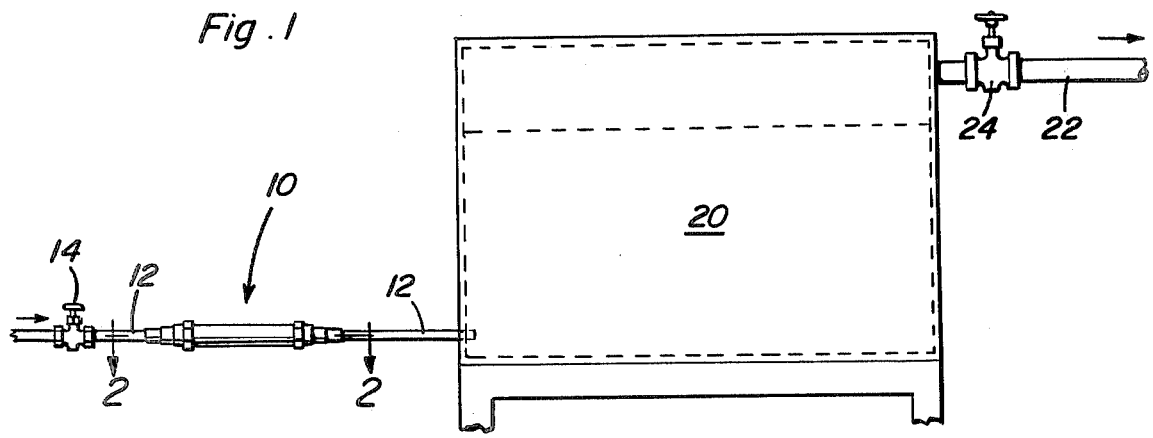
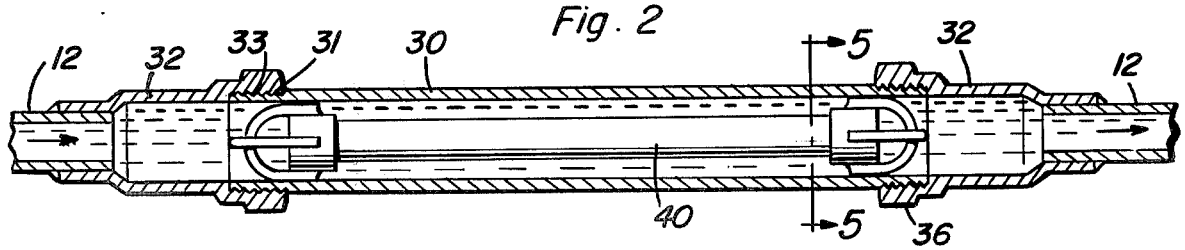
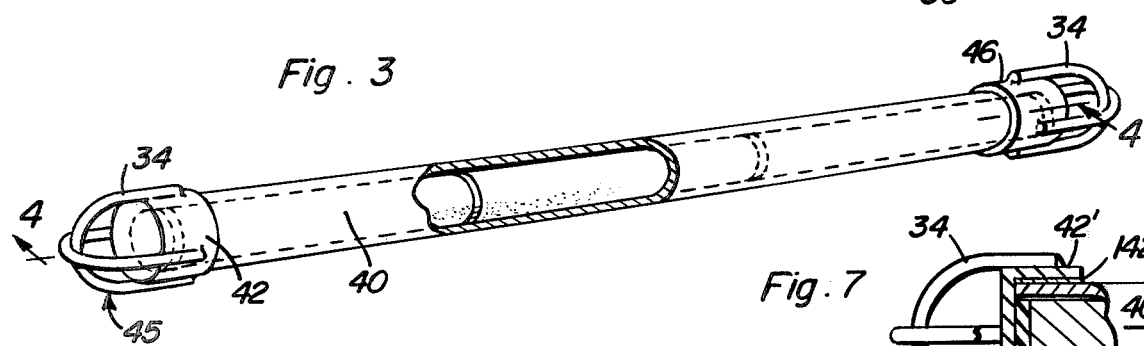
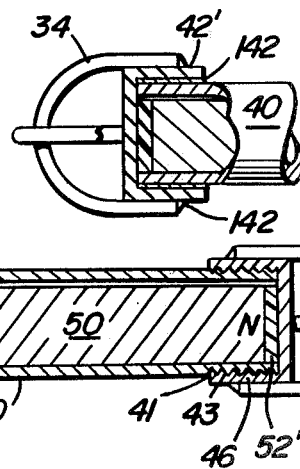
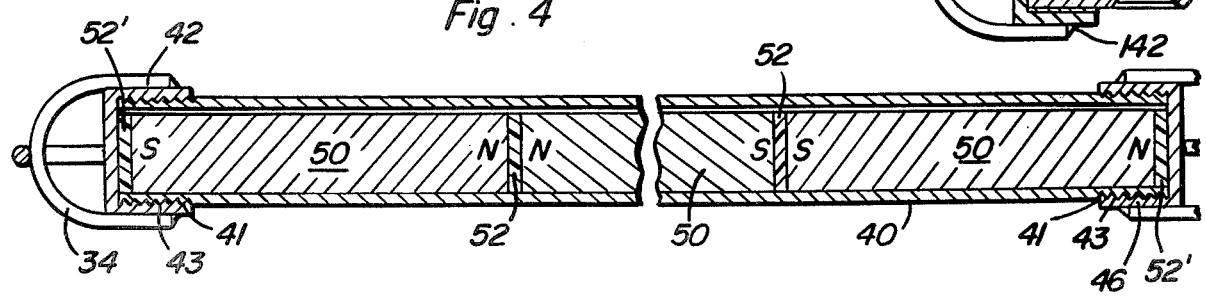
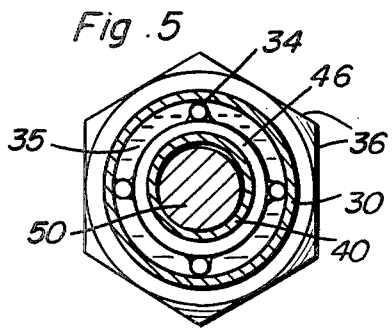
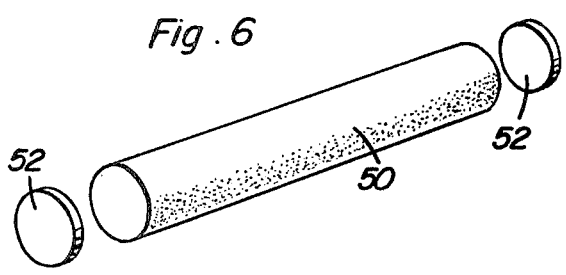

COAXIAL HYDROMAGNETIC DEVICE FOR HYDRAULIC CIRCUITS CONTAINING CALCIUM AND MAGNESIUM IONS

CROSS-REFERENCE TO RELATED APPLICATION

This application relates to U.S. application Ser. No. 759,589, filed Jan. 4, 1977, now abandoned.

BACKGROUND OF THE INVENTION

I. Field of the Invention

The present invention relates generally to hydromagnetic devices and particularly to a device capable not only of affecting the adhesion of scale to heat transfer surfaces but also of initiating the in-stream nucleation and subsequent precipitation of scale-forming materials within a flowing body of water.

II. Description of the Prior Art

Magnetic field effects have previously been used in attempts to affect the scale-forming properties of water at least as early as 1865. Parry, in U.S. Pat. No. 50,773, describes the "conditioning" of water with a device employing a magnet. However, critical evaluation of magnetic water treatment devices has usually shown that prior to the present invention magnetic conditioning devices had little effect on corrosion of water-carrying pipes or other steel surfaces, scale formation on such surfaces being typically unaffected by such devices.

More recently, further water conditioning apparatus has been described by Sanderson in U.S. Pat. No. 3,951,807, the Sanderson device including axially aligned magnetic structures wherein like poles are disposed in contiguous relation. Kottmeier, in U.S. Pat. No. 3,923,660, similarly discloses a device for treating water with a magnetic field, the device including a plurality of magnets arranged axially with like poles of contiguous magnets arranged adjacent to each other to create lines of force extending laterally and longitudinally of the magnets. Happ et al describe, in U.S. Pat. Nos. 3,699,274 and 3,680,705, similar water conditioning devices.

While hydromagnetic devices are known in the art as is evidenced from the discussion provided, the art has not provided until presently a hydromagnetic device which is sufficiently efficient to warrant widespread domestic or industrial use. The present invention, particularly by providing structure capable of initiating auto-nucleation of scale within the bulk of a liquid passing through a hydromagnetic device, provides structure of sufficiently increased efficiency as to now warrant a greater usage of such devices for water conditioning purposes.

SUMMARY OF THE INVENTION

The invention provides a coaxial hydromagnetic device which not only inhibits the adhesion of calcium and magnesium scale to heat transfer surfaces, boiler walls and the like, but also initiates auto-nucleation of scale within the bulk of a liquid passing through the device. According to a particular teaching of the invention, a plurality of suitably shaped and suitably disposed permanent magnets are arranged to produce optimized interactions between the electrically conductive flowing liquid which is to be conditioned and the generated electrical potentials and currents, the effect of the present structure being to shift the usual precipitation of scale from heat transfer surfaces to precipitation within the liquid itself. The present hydromagnetic structure produces a plurality of regions of maximum magnetic intensity coinident with annular constrictions in a conduit through which the fluid flows. The combination of intense magnetic fields coupled with increased fluid velocity due to the constrictions formed in the conduit as aforesaid acts to produce electrical voltages which are greater than the activation potentials required for auto-nucleation. The direction of magnetic and electric field vectors within the present structure are oriented in a selected manner to the flow of the liquid passing through the device, this orientation being preferably perpendicular. Low velocity regions immediately downstream of the constrictions produce turbulence and mixing, thereby increasing precipitation of scale from the liquid.

The magnetic water conditioning devices according to the invention find numerous applications, a characteristic common to the applications being the ability to reduce the maintenance and extend the life of equipment with which the devices are used. Present devices can particularly be inserted into water pipes that carry hot or cold water to a water container, hot water heater, steam boiler, or the like, and will act to inhibit calcium and other chemical deposits in the pipe, container, or the like, without resorting to the use of a filter, water softener, or chemical additive. The present devices also facilitate the removal of existing "scale" from pipes which already contain a build up of calcium and other chemical deposits. Basic to the teachings of the present invention is the provision of a plurality of permanent magnets in a series arrangement wherein like poles are adjacent like poles, the magnets being preferably fully enclosed in a liquid-tight non-ferrous receptacle. The receptacle may be formed of copper, brass, plastic, or other non-ferrous, non-magnetic materials. Solid non-magnetic spacers are preferably disposed between the like poles of adjacent magnets. The magnet-containing receptacle can be mounted in a non-magnetic, non-ferrous outer envelope and supported therein by means of support structure. The outer envelope can be mounted within a water feed-line or other water flow system. When the water or other electrically conductive liquid flows by one of the present devices (or the device is moved relative to the water), the water "cuts" the magnetic field produced by the device, activation potentials required for nucleation then being exceeded as aforesaid. Precipitate thus formed can then be flushed from the water system. Use of the present devices extends the useful life and reduces maintenance of water systems.

In a particular embodiment of the invention, the present hydromagnetic device comprises an outer envelope through which liquid is caused to flow, the envelope having a plurality of spaced annular constrictions formed therein and one or more permanent magnets held within a central hollow cavity of the envelope. Permanent magnets located centrally of the hollow cavity have like poles contiguous to each other in axial alignment, the like poles being effectively contiguous within the respective planes defined by the annular constrictions. In this manner, regions of maximum magnetic intensity physically coincide with the location of the annular constrictions, the constrictions causing an increase in localized liquid velocity within the regions of maximum magnetic field intensity. In a further preferred embodiment of the invention, circular magnets having like poles are contiguously arranged about the exterior of an annularly constricted outer envelope, a soft iron core being held within a central hollow cavity of the envelope. Therefore, liquid flowing through the envelope is accelerated by spaced annular constrictions, the external magnets being located such that regions of maximum magnetic intensity coincide with the regions of increased liquid velocity. In the several embodiments of the invention, the structure located interiorly of the constricted envelope is preferably removable in order to permit disposal of scale particles which accumulate within the interior of the envelope.

It is therefore an object of the present invention to provide a hydromagnetic device capable of inhibiting adhesion of calcium and magnesium scale to heat transfer and similar surfaces and of initiating auto-nucleation of scale within the bulk of a liquid passing through the device, thereby to control the precipitation of scale by shifting scale precipitation from deposition on surfaces to precipitation upon itself within the liquid by auto-nucleation.

It is another object of the invention to provide a hydromagnetic device which combines hydromagnetic, electrokinetic, physico-chemical, nucleation, and other phenomenon in a single device to control scale precipitation, the present device further being operable without the need for moving parts or electrical power, energy necessary to cause adequate functioning of the device being derived solely from the kinetic energy of the liquid moving relative to the device.

It is a further object of the present invention to provide a coaxial hydromagnetic device comprised of a plurality of permanent magnets suitably shaped and arranged relative to a conduit through which a liquid to be conditioned flows, the conduit having spaced annular constrictions which cause the flowing liquid to increase in local velocity in regions of maximum magnetic intensity, thereby to produce electrical voltages greater than the activation potentials required for auto-nucleation.

Further objects and advantages of the present invention will become more readily apparent in light of the following detailed description of the preferred embodiments of the invention.

BRIEF DESCRIPTION OF THE DRAWINGS

FIG. 1 is an elevational view illustrating a use environment of the conditioning devices according to the invention;

FIG. 2 is an elevational view in partial section taken along line 2—2 of FIG. 1, a simplified embodiment of the invention being illustrated;

FIG. 3 is a perspective view of the simplified embodiment of FIG. 2;

FIG. 4 is an elevational view in partial section taken along 4—4 of FIG. 3;

FIG. 5 is a cross-sectional view taken along 5—5 of FIG. 2;

FIG. 6 is a perspective view of a permanent magnet which can be utilized in the invention, non-metallic spacers which are disposed between such magnets being also illustrated;

FIG. 7 is an elevational view in partial section of a particular structure for mounting a magnet-containing receptacle within an outer envelope;

DESCRIPTION OF THE PREFERRED EMBODIMENTS

Figure 8:
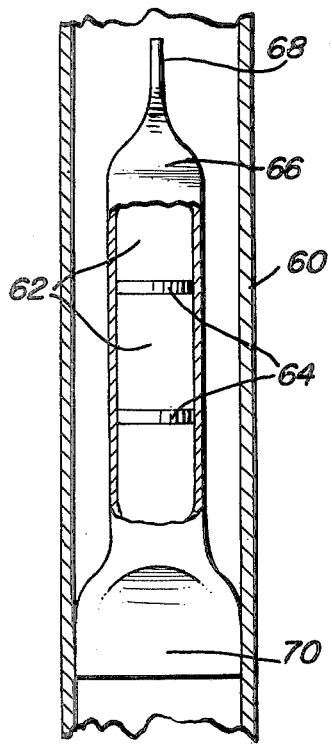
FIG. 8 is a perspective view partially cut-away and illustrating a further arrangement for mounting a magnet-containing receptacle within an outer envelope.

Referring now to FIG. 1 of the drawings, reference numeral 10 indicates a simplified magnetic water conditioning device according to the invention installed in a water flow input line of a water system. The conditioning unit is inserted in series with a water inflow line 12 having an inlet valve 14 and connecting in turn to a water system unit 20. An output line 22 is provided in the unit 20, particularly when the unit 20 comprises a hot water heater, boiler, vending system or the like, an outlet valve 24 being provided in the output line 22.

In FIGS. 2-7, the simplified device 10 is seen to comprise a tubular outer envelope 30 provided with threaded ends 31. Received upon each of the threaded ends 31 are coupling members 32 having complementary threaded ends 33 for attachment to the tubular envelope 30. The other ends of the coupling members 32 are suitably reduced to fit the inflow line 12, the coupling members 32 being capable of modification as necessary to the intended usage. Water or other conductive liquid which is to be treated flows within the envelope 40 past a magnet-containing inner receptacle 40, the inner receptacle 40 being also see in FIGS. 3 and 4 to consist of a tubular member having threaded ends 41 provided thereon. One end 41 is covered with a removable cap 42 having a threaded aperture 43 therein. The cap 42 is preferably liquid or water-tight yet offers ready access to permanent magnets mounted within the receptacle 40 as will be described hereinafter. The other threaded end 41 of the receptacle 40 is provided with a cap 46 having a threaded aperture 43 which mates with the threaded end 41.

Spider members 34 are received over each end 41 of the receptacle 40, the members 34 supporting and aligning the inner receptacle 40 within the outer envelope 30. The spider members 34 also act as "stops" to retain the receptacle 40 in a stationary position within the outer envelope 30. The spider members 34 may be formed of metal and soldered, such as at 142 in FIG. 7, or brazed to the end caps 42 and 46. The members 34 may be formed of plastic and either frictionally retained or adhesively bonded to the end caps.

The inner receptacle 40 contains permanent magnets 50 which are of slightly smaller outer diameter than the inner diameter of the receptacle 40, the magnets 50 slidably fitting with the receptacle 40. Spacer members 52 formed preferably of non-metallic material are shaped in the form of solid discs and are provided between adjacent ends of the permanent magnets 50. One feature of this simplified embodiment of the invention is a provision of like poles of the permanent magnets 50 in adjacent relation to each other within the aligned series of magnets. As particularly seen in FIG. 4, the north poles of the left-most permanent magnet and the middle magnet are arranged together, while the south pole of the center magnet is closely aligned with the south pole of the right-most magnet. The spacer members 52 are preferably formed of a plastic material, but may be formed of any non-metallic, solid material. End spacers 52' may also be provided as seen in FIG. 4 to insure that the permanent magnets do not move within the receptacle 40. The receptacle 40 and the outer envelope 30, while preferably formed of copper pipe or tubing, may be formed of any non-ferrous material, such as brass, plastic or the like.

FIG. 5 further illustrates the mounting of the inner receptacle 40 by means of the spider members 34, the space 35 lying between the members 34 allowing water flow therethrough. The coupling members 32 can be provided with hexagonal portions 36 to facilitate installation of the device 10.

FIG. 6, a single permanent magnet is illustrated with the solid disc spacer members 52 in the associated relation desired within the inner receptacle 40 with the exception that the spacer members 52 are spaced from the magnet 50 for purposes of illustration. In FIG. 7, the ends of the inner receptacle 40 are soldered to the caps, threads being eliminated from the connection. Such a connection provides increased protection from water entry into the receptacle 40, it being desirable to prevent contact between the water and the magnets 50 in order to avoid corrosion of the magnets, thereby to increase the life span of the device 10.

Referring now to FIG. 8, a further embodiment of the present invention can be seen to comprise a tubular envelope 60 through which water is adapted to pass in the manner described previously relative to the tubular envelope 30. Magnets 62 are held within an inner receptacle 66 and spaced apart by spacer member 64 in a manner substantially identical to that described hereinabove. The inner receptacle 66 is seen to be mounted within the tubular envelope 60 by means of a horizontal crimped end 68 and a vertical crimped end 70, the planes in which the ends 68 and 70 lie being essentially perpendicular to each other. Lateral outer edge portions of the crimped ends 68 and 70 abut inner surfaces 72 of the tubular envelope 60, thereby to maintain the inner receptacle 66 within the tubular envelope 60. Accordingly, the crimped ends 68 and 70 constitute a simple, yet effective structure for mounting the magnet-containing inner receptacle 66 within the tubular envelope 60. As shown in FIG. 8, the magnets 62 preferably comprise samarium-cobalt magnetic members, the length to diameter ratio preferably being between 0.5 to 1.0. When the length to diameter ratio is less than 0.5, that is, when the magnets are relatively "short," a straight tubular member may be used.

Figure 9:
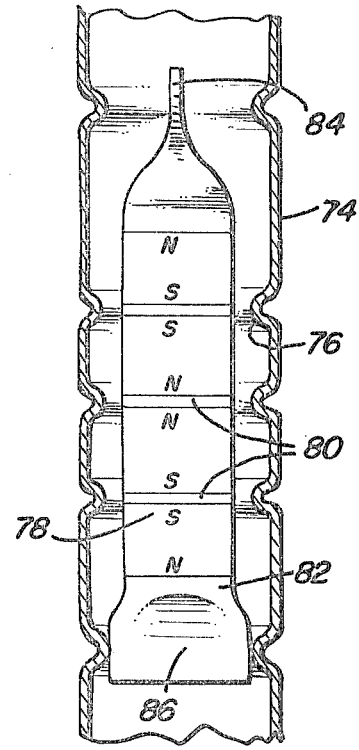
FIG. 9 is an elevational view partially cut-away and illustrating mounting of the receptacle according to the structure shown in FIG. 8 with an outer envelope having annular constrictions formed therein.

Referring now to FIG. 9, a tubular envelope 74 corresponding in basic construction to the tubular envelope 60 of FIG. 8 is shown to be formed with a plurality of spaced annular constrictions 76 formed therein. Magnets 78 are held in spaced relation by spacer members 80 within an inner receptacle 82, the receptacle 82 having a horizontal crimped end 84 at one end thereof and a vertical crimped end 86 at the other end thereof. The crimped ends 84 and 86 substantially correspond to the crimped ends 68 and 70 described relative to FIG. 8. Outermost constrictions 76 at either end of the tubular envelope 74 are of an inner diameter which corresponds to the width of the crimped ends 84 and 86, the inner receptacle 82 thereby being mounted within the tubular envelope 74 by abutment of the crimped ends 84 and 86 against the outermost annular constriction 76. The magnets 78 are seen to be arranged within the inner receptacle 82 in essentially the same manner as that described hereinabove relative to FIGS. 1-7. In particular, like poles in the spaced magnets 78 are arranged adjacently in the aligned series of magnets. Further the effective magnetic interface of the like magnetic poles are disposed within the envelope 74 to align with the interior annular constrictions 76. In effect, the annular constrictions 76 are located on the tubular envelope 74 such that each said constriction 76 coincides with one source or "sink" of magnetic field lines produced by the magnets 78. As will be described in more detail hereinafter, the annular constrictions 76 act to increase the velocity of a fluid flowing through the tubular envelope 74, the magnetic field produced by the juxtaposition of like poles in the vicinity of the annular constriction 76 acting to produce electrical voltages which exceed the activation potentials of scale-forming chemical reactions. Accordingly, scaled materials are caused to undergo auto-nucleation within the body of the liquid flowing through the tubular envelope 74.

Figure 10:
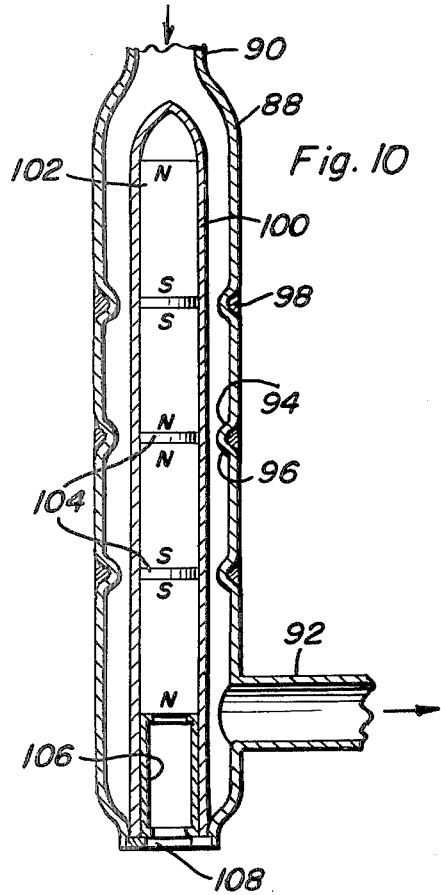
FIG. 10 is an elevational view illustrating a further embodiment of the invention, the outer envelope having annular constrictions formed therein which coincide spatially with regions of maximum magnetic intensity produced by aligned magnets held within the envelope; and, FIG. 11 is an elevational view illustrating a still further embodiment of the invention, the outer envelope having annular constrictions formed therein which coincide spatially with regions of magnetic intensity produced by aligned magnets disposed exteriorly of the envelope.

Referring now to FIG. 10, the particular hydromagnetic device according to the invention is seen to comprise a tubular envelope 88 through which an electrically conductive liquid which is to be treated is caused to flow, the liquid flowing into the tubular envelope 88 through an inlet 90. While the tubular envelope 88 can be arranged to allow fluid flow therethrough in a straight line, it is also possible to utilize an outlet 92 which is disposed essentially perpendicularly to the direction of flow of the liquid through the tubular envelope 88. This 90° liquid flow allows the tubular envelope 88 to be opened at the end opposite from the inlet 90 to allow removal of interior structure as will be described hereinafter. The tubular envelope 88 is seen to have a plurality of annular constrictions 94 formed therein, the constrictions 94 causing the liquid to increase in velocity locally as the liquid moves past the constrictions 94. Low velocity regions 96 are located immediately downstream of the annular constrictions 94, the liquid being subjected to turbulence and mixing in the low velocity region 94 thereby to increase precipitation of scale from the liquid as will be more fully described hereinafter. The constrictions 94 are preferably formed in the tubular envelope 88 with annular depressions extending about the exterior of the envelope 88, these depressions being filled with magnetic material 98 in order to further intensify the magnetic field which exists at the constrictions 94, the magnetic field being generated by magnets 102 held within an inner receptacle 100 as aforesaid. The magnets 102 may be spaced within the inner receptacle 100 by spacer members 104 as aforesaid. Like poles of the magnets 102 are disposed in adjacent relation within the inner receptacle 100. Each "like-pole interface" coincides in location with one of the annular constrictions 94, a region of maximum magnetic intensity being thereby coincident with each of the annular constrictions 94. The combination of intense magnetic field coupled with increased fluid velocity due to the constrictions 94 formed in the envelope 88 acts to produce electrical voltages which are greater than the activation potentials required for auto-nucleation within the body of the liquid. By virtue of the present structure, the liquid flow is caused to be essentially perpendicular to the magnetic fields generated by the magnets 102. As the liquid passes at increased velocity through the magnetic fields in the regions of the constrictions 94, scale-producing chemical reactions are initiated, the low velocity regions 96 downstream of the constrictions 94 producing a turbulence and mixing which increases the precipitation of scale from the liquid. The inner receptacle 100 can be further seen to enclose a spacer tube 106 therewithin near the outlet 92, the spacer tube maintaining the magnets 102 in desired locations within the interior of the tubular envelope 88. A removable retaining ring 108 allows access in a known manner to the interior of the tubular envelope 88 in order that the inner receptacle and/or the magnets 102 can be removed from the interior of the tubular envelope 108 for maintenance. The end of the inner receptacle 100 opposite the retaining ring 108 can be mounted within the interior of the tubular envelope 88 in a manner such as described hereinabove which will not effectively impede the flow of liquid into the envelope 88.

Figure 11:
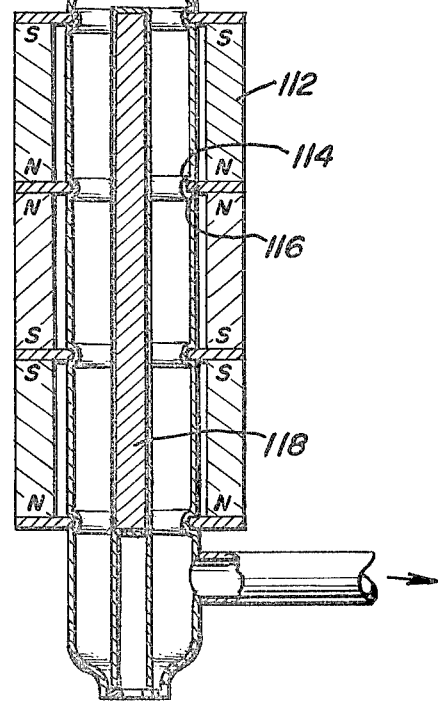

Referring now to FIG. 11, an "inside-out" embodiment of the invention is shown, the hydromagnetic device shown comprising a tubular envelope 110 having a plurality of annular constrictions 114 formed therein as aforesaid. In this embodiment, however, magnets 112 are annularly formed in a hollow cylindrical configuration such that the magnets 112 fit over the exterior of the tubular envelope 110. In a fashion effectively identical to the structures described hereinabove, like poles of the magnets 112 are caused to be adjacent within the series of magnets. The juxtaposed like poles of the magnets 112 are further caused to be located in the region of the annular constrictions 114 in a manner effectively identical to that described hereinabove relative to FIG. 10 inter alia. The magnets 112 can be spaced apart by ferromagnetic material 116 which can take the form of soft iron washers. A ferromagnetic inner core 118, which can be formed of soft iron inter alia, is disposed centrally of the interior of the tubular envelope 110 and can be held therein in a manner essentially identical to the mounting of the inner receptacle 110 of FIG. 10 within the tubular envelope 88 thereof. Electrically conductive liquid flowing through the interior of the tubular envelope 110 is caused to undergo an increased localized velocity in the region of the annular constrictions 114, the liquid further being subjected to maximum magnetic intensity in the region of the annular constrictions, thereby to cause auto-nucleation of scale-forming substances within the body of the liquid.

The materials which are preferably employed in the construction of the several embodiments of the invention and which come in contact with liquid which is to be treated or preferably formed from copper, non-magnetic alloys, or stainless steel. The ferromagnetic materials employed can be formed of soft iron or other material which acts to effectively increase the intensity of the magnetic field at the desired locations. It is to be understood that the invention can be practiced other than as particularly described hereinabove, the scope of the invention being defined by the appended claims.

What is claimed:

1. In an apparatus for inhibiting the formation of scale on surfaces which contact liquids, the apparatus including a conduit member through which a liquid flows, the improvement comprising:

a plurality of magnetic members arranged in series and carried by the conduit member, adjacent magnetic poles of the magnetic members being of like polarity, each pair of adjacent magnetic poles generating a region of maximum effective magnetic field intensity within the interior of the conduit member and radially proximous to the adjacent magnetic poles, the liquid passing through the region of magnetic intensity thus generated; and, an annular constriction formed in the conduit member radially outwardly of each of the regions of maximum magnetic field intensity, the constriction effectively lying in a plane essentially coincidental with the loci of maximum magnetic flux within the region of maximum magnetic field intensity, the annular constriction acting to constrict liquid flow to thereby increase the velocity of the liquid in the radially adjacent region of maximum magnetic field intensity, thereby to initiate auto-nucleation of scale within the body of the liquid.

2. In the apparatus of claim 1, wherein the planes in which the annular constrictions lie are perpendicular to the flow of the liquid through the conduit member.

3. In the apparatus of claim 1, wherein the formation of each annular constriction in the conduit member forms an annular depression on the surface of said conduit member, the apparatus further comprising ferromagnetic material disposed within the annular depressions and forming rings of ferromagnetic material within said annular depressions.

4. In the apparatus of claim 1 and further comprising ferromagnetic material disposed on the conduit member in the region of each annular constriction.

5. In the apparatus of claim 1 and further comprising spacer means disposed between the adjacent magnetic members for holding the magnets in a spaced relation.

6. In the apparatus of claim 1 and further comprising members for mounting the magnetic means to the conduit member.

7. In the apparatus of claim 6 wherein the mounting means comprise a tubular receptacle disposed interiorly of the conduit member in contact with the liquid, the magnetic members being held within the interior of the tubular receptacle and witheld from contact with the liquid.

8. In the apparatus of claim 7 wherein the mounting means further comprise spider members disposed at the ends of the tubular receptacle, the spider members abutting inner surfaces of the conduit member to hold the tubular receptacle therewithin without impeding liquid flow through the conduit member.

9. In the apparatus of claim 7 wherein the mounting means further comprise crimped portions located at the respective ends of the tubular receptacle, the planes of the crimped portions being disposed in annularly offset relation to each other, lateral edge portions of the crimped portions abutting inner surfaces of the conduit member to hold the tubular receptacle therewithin.

10. In the apparatus of claim 1, wherein the magnetic members are annular and are disposed on the exterior of the conduit member, the apparatus further comprising a core of ferromagnetic material disposed within the interior of the conduit member.

* * * * *